No. 628,359. Patented July 4, 1899.
F. SCHINDLER.
TIN OR CAN FOR CONTAINING CANNED FOODS.
(Application filed Apr. 29, 1899.)
(No Model.)
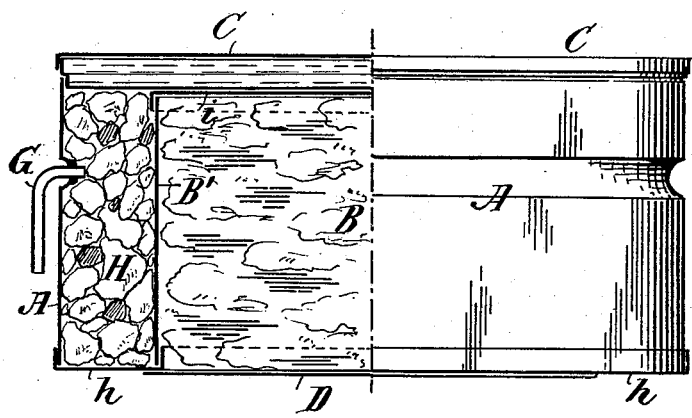
Witnesses:
Clarence A. Bateman
Katharine T. Collins
Inventor:
F. Schindler
by
Wilkinson & Fisher
Attys.

UNITED STATES PATENT OFFICE.

FRIEDRICH SCHINDLER, OF VIENNA, AUSTRIA-HUNGARY.

TIN OR CAN FOR CONTAINING CANNED FOODS.

SPECIFICATION forming part of Letters Patent No. 628,359, dated July 4, 1899.

Application filed April 29, 1899. Serial No. 715,028. (No model.)

*To all whom it may concern:*

Be it known that I, FRIEDRICH SCHINDLER, a subject of the Emperor of Austria-Hungary, residing at I Wildpretmarkt 10, in the city of Vienna, Empire of Austria-Hungary, have invented certain new and useful Improvements in Tins or Cans for Containing Canned Foods; and I do hereby declare the following to be a full, clear, and exact description of the invention, such as will enable others skilled in the art to which it appertains to make and use the same.

My invention has for its object to provide a cheap, simple, and efficient tin or can for containing canned foods or the like, which can is adapted to heat the contents thereof without the use of fire heat, but only by slaking unslaked lime contained in a compartment of the tin with water contained in another compartment of the tin or in the hollow cover thereof.

The accompanying drawing represents a sectional elevation, partly in vertical central section, of a can constructed in accordance with my invention.

B is the can proper, preferably cylindrical in shape. B' is the side wall thereof.

$i$ is the cover of the can proper, soldered onto the side wall B'.

A is the side wall of the outer casing, concentric with the can B.

$h$ is an annular bottom plate soldered onto the bottom edges of the side walls B' and A and constituting the bottom of the annular space H between the side walls B' and A.

D is a bottom plate soldered onto the annular bottom plate $h$ and constituting the bottom of the can proper, B.

C is a hollow cover soldered to the top edge of the outer side wall A and constituting the cover of the can as an entirety.

G is a lead tube secured to the side wall A and communicating with the annular space H.

The preserve tin or can proper, B, having been connected with the outer side wall A by the bottom plate $h$ and filled and hermetically closed by soldering on the cover $i$ and the bottom D, the annular space H is filled with burned unslaked lime and is then hermetically closed by soldering onto the outer side wall A the hollow cover C, the hollow space of which is filled with water. Then the air is removed from the annular space H by connecting the lead tube G with an air-pump, and a suitable vacuum having been produced in the space H the tube G is sealed. The tin is then ready for use.

All that is necessary for heating the contents of the preserve-tin proper, B, is to puncture the hollow cover C by means of a nail or the like driven into the same, so as to penetrate both of its faces at any point. The water contained in the hollow cover then enters the space H, and coming into contact with the lime contained therein slakes the same, whereby sufficient heat is produced to heat the contents of the can B to the required temperature. The vacuum produced in the space H, on the one hand, prevents the lime from becoming slow in slaking and, on the other hand, promotes the penetration of the water into the lime-space H.

I claim—

1. The combination with the side wall B' of a preserve-tin proper B a cover $i$ soldered onto the upper edge of it, an outer side wall A concentric with the side wall B' of the preserve-tin proper, a bottom plate $h$ soldered onto the bottom edges of the two side walls, a hollow cover C soldered onto the upper edge of the outer shell A such hollow cover being adapted to contain water and to be punctured from the exterior, while the annular space H is adapted to contain unslaked lime, and a lead pipe G communicating with the interior of the said hollow space H and adapted to be connected with an air-pump and to be sealed after the removal of air from such annular space, substantially as described.

2. In a device of the character described, a can having a cylindrical compartment, an annular space for slaked lime exterior thereto, a pipe or nipple through which air may be exhausted from said annular space, and a water-cap above said annular space adapted to be perforated from the exterior into said annular space, substantially as described.

In testimony whereof I affix my signature in presence of two witnesses.

FRIEDRICH SCHINDLER.

Witnesses:
ALVESTO S. HOGUE,
AUGUST FUGGER.